March 13, 1956 K. C. BUGG 2,738,136
COIL WINDING APPARATUS
Filed Aug. 22, 1952 5 Sheets-Sheet 1

INVENTOR.
Kenly C. Bugg,
BY
Wilkinson, Huxley, Byron & Hume
ATTYS

March 13, 1956
K. C. BUGG
2,738,136
COIL WINDING APPARATUS
Filed Aug. 22, 1952
5 Sheets-Sheet 2
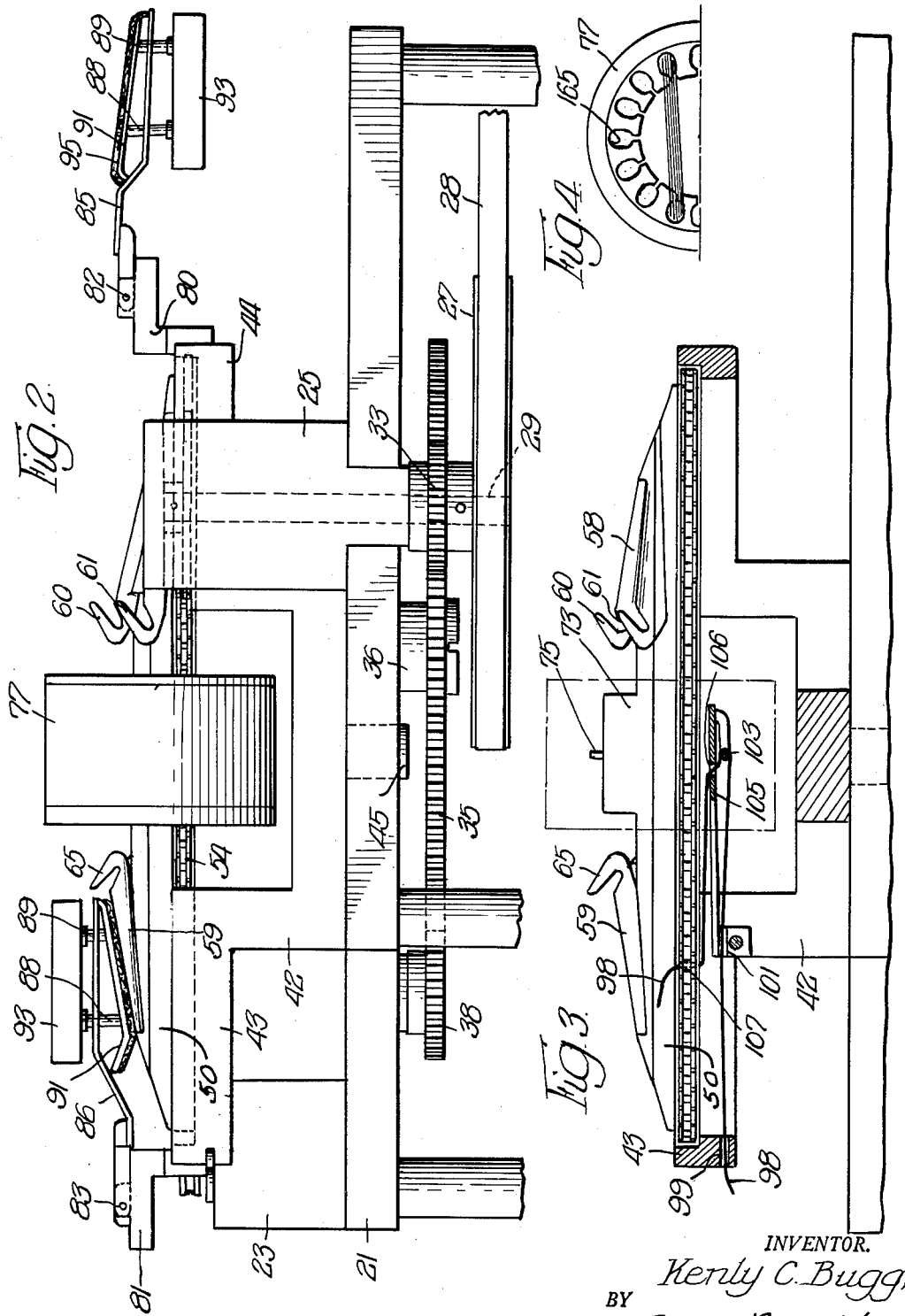
INVENTOR.
Kenly C. Bugg,
BY March 13, 1956  K. C. BUGG  2,738,136
COIL WINDING APPARATUS
Filed Aug. 22, 1952  5 Sheets-Sheet 3
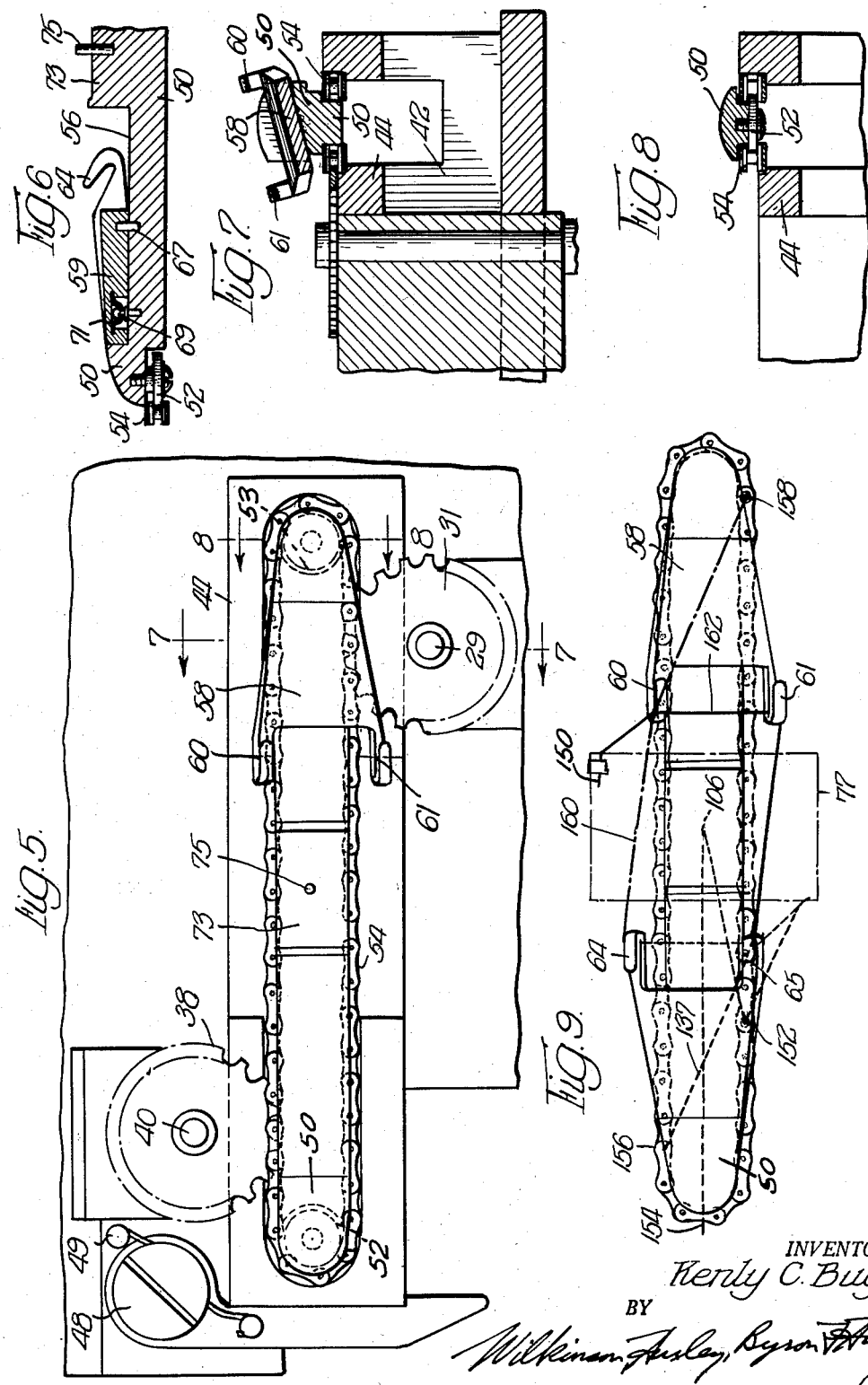
INVENTOR.
Kenly C. Bugg, March 13, 1956     K. C. BUGG     2,738,136
COIL WINDING APPARATUS
Filed Aug. 22, 1952     5 Sheets-Sheet 4
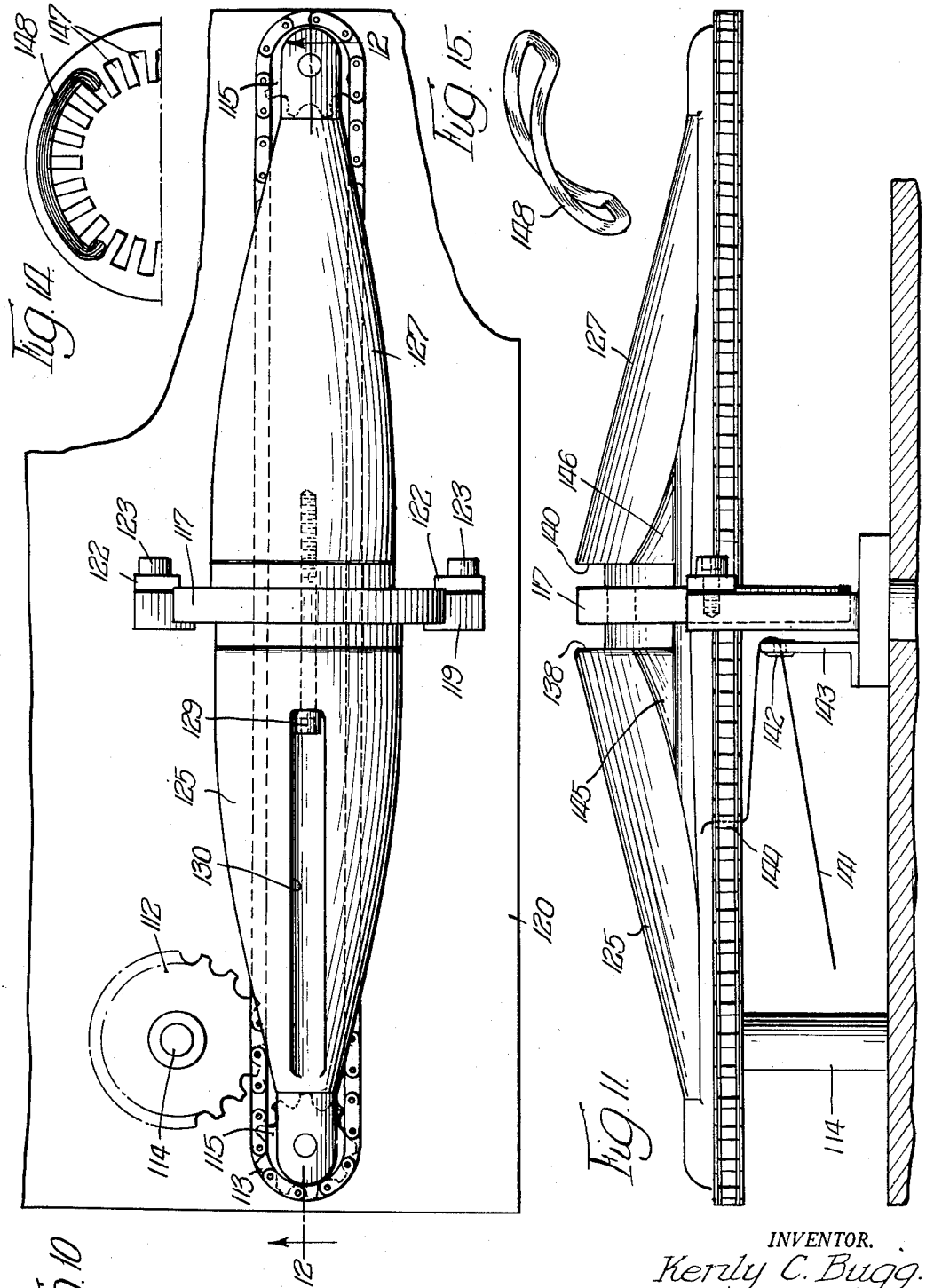
INVENTOR.
Kerly C. Bugg
BY
Wilkinson, Huxley, Byron & Hume
ATTYS March 13, 1956  K. C. BUGG  2,738,136
COIL WINDING APPARATUS
Filed Aug. 22, 1952  5 Sheets-Sheet 5
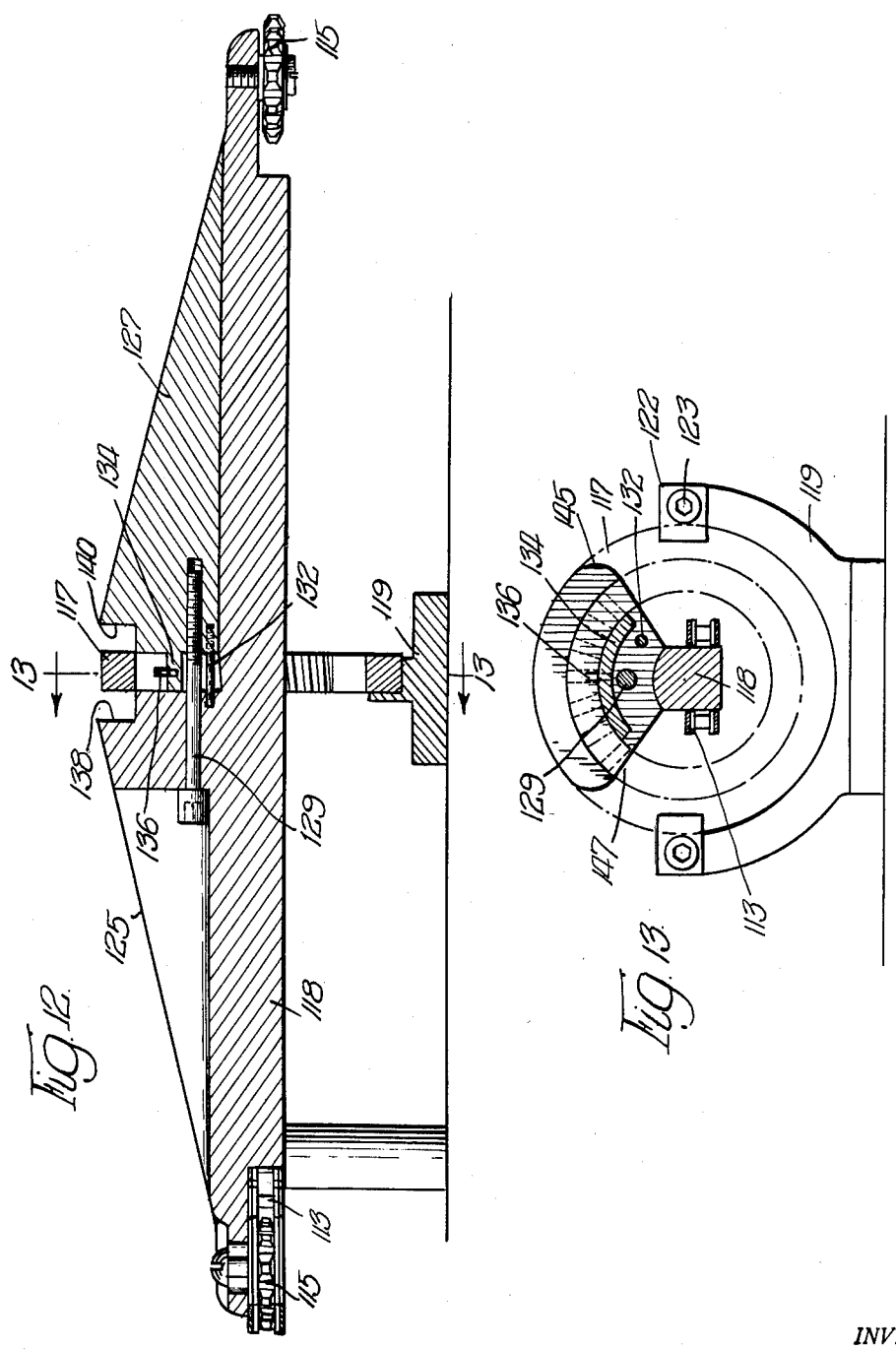
INVENTOR.
Kenly C. Bugg,
BY
Wilkinson, Huxley, Byron & Hume
ATTYS.

United States Patent Office 2,738,136
Patented Mar. 13, 1956

2,738,136

COIL WINDING APPARATUS

Kenly C. Bugg, Fort Wayne, Ind., assignor, by mesne assignments, to Kendick Manufacturing Company, Inc., Fort Wayne, Ind., a corporation of Indiana Application August 22, 1952, Serial No. 305,891

21 Claims. (Cl. 242—1)

This invention relates to a new and improved coil winding apparatus, and more particularly to apparatus especially adapted for winding field coils for motors, generators, or the like.

In such devices the field magnet is normally in the general form of a hollow cylinder or a toroid of rectangular cross section with a plurality of axial slots in the inner surface. In certain special cases, such as extremely accurate types of synchronous motors, these slots are formed at an angle to the axis of the cylinder. Also, in some cases the slots at the inner surface of the cylinder are relatively narrow, but widen as they extend into the cylinder wall. In some constructions the slots are circular in cross section with only a narrow opening on the inner face of the field magnet. The stator coils are each wound into a spaced pair of such slots.

Certain specific types of synchronous motors are designed to be connected in pairs, so that with one as a master or generator, the second, called a motor, will turn its rotor to exactly the same relative position. Such motors are given various names, being called "synchros" by the Navy and being used generally to transmit data to a distance. To be efficient it is essential that the motor turn its rotor very exactly to correspond with the generator and thus to transmit exact and correct data. To accomplish this result it is necessary that the stator coils be wound with great accuracy and uniformity. These windings must be accurate, not only as to the number of turns, but as to the length of the turns, and their positioning relative to each other and to the stator or field structure.

It is an object of the present invention to provide a new and improved coil winding apparatus for winding motor coils or the like.

It is an additional object to provide apparatus of this character adapted to uniformly and accurately wind and position coils in the slots of a stator structure.

It is also an object to provide such apparatus which will operate to wind wire directly from a spool without the necessity of using bobbins or other intermediate wire holding members.

It is a further object to provide apparatus of this type including coil forming means for forming the transverse ends of the stator coils.

It is another object to provide a construction in which the tensioning of the wire is substantially uniform throughout the formation of the coils including their opposite end loops.

It is an additional object to provide apparatus including a continuous chain feed for the wire turns, both runs of the chain passing through the interior of the stator structure.

It is also an object to provide apparatus of this character which may be readily inserted into and removed from the stator structure and may also be easily connected to and removed from its supporting and driving mechanism.

It is a further object to provide such an apparatus adapted for commercial production and use.

Other and further objects will appear as the description proceeds.

I have shown certain preferred embodiments of my invention in the accompanying drawings, in which—

Figure 2 is a side elevation of the construction of Figure 1;

Figure 3 is a partial view, similar to Figure 2, with parts removed and broken away to more clearly show the construction;

Figure 4 is a half end view of a stator with a single coil wound therein;

Figure 5 is a plan view of the construction of Figure 1 with parts removed to show the drive mechanism;

Figure 6 is a fragmentary longitudinal section showing the means for removably securing in place the guide and hook members;

Figure 7 is a section taken on line 7—7 of Figure 5;

Figure 8 is a section taken on line 8—8 of Figure 5;

Figure 9 is a diagrammatic plan view of the construction of Figure 1 showing the winding of a turn of wire;

Figure 10 is a plan view of a modified form of construction;

Figure 11 is a side elevation of the construction of Figure 10;

Figure 12 is a longitudinal section taken on line 12—12 of Figure 10;

Figure 13 is a cross section taken on line 13—13 of Figure 12;

Figure 14 is a half elevation showing a single coil in place on a stator; and

Figure 15 is a perspective view of a coil as wound by the apparatus.

Figure 1:
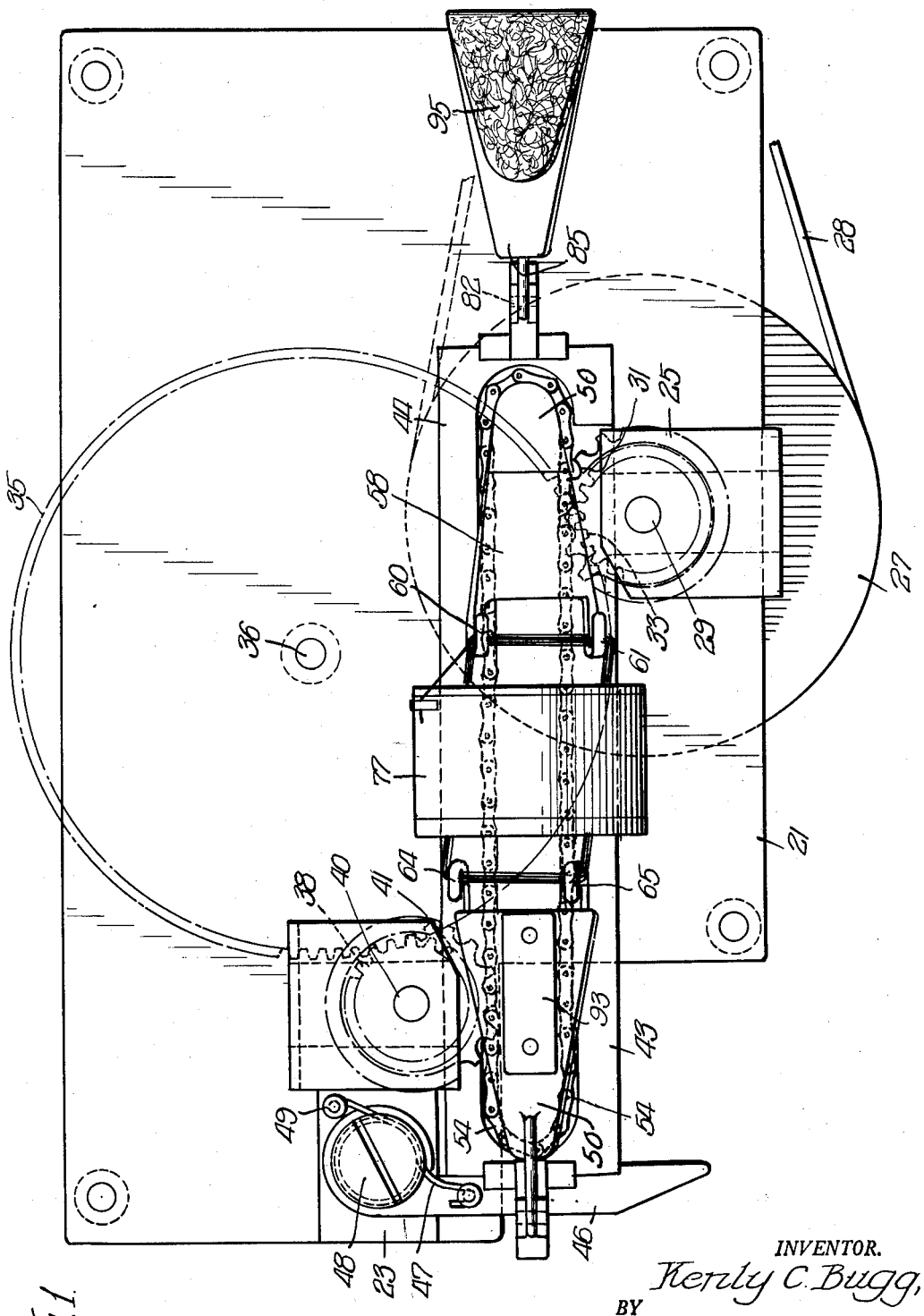
Figure 1 is a plan view of one form of construction showing a stator in place and partially wound.

As disclosed in the drawings, with particular reference to Figures 1 and 2, the apparatus is shown as supported on a table 21, which carries spaced support members 23 and 25.

The drive mechanism as shown consists of a pulley 27 driven by a belt 28, this pulley 27 being secured to a vertical shaft 29. This shaft 29 carries at its upper end a sprocket wheel 31. The lower portion of the shaft 29 carries a gear 33, which, through an intermediate gear 35 on shaft 36, drives a gear 38 at the same speed as gear 33. The gear 38 is on the lower end of a vertical shaft 40, the upper end of which carries a sprocket gear 41 identical with the sprocket gear 31. The coil winding mechanism itself is removably supported on the structure described, together with the U-shaped support 42, which has horizontally extending arms 43 and 44. In the operating position as shown in Figure 1, these arms 43 and 44 extend closely adjacent the supports 23 and 25 and in part lie below the sprocket wheels 31 and 41. The support member 42 is, however, mounted on a stub shaft 45 fitted in a bearing in table 21 so that it may be given a limited rotation to clear the sprockets 31 and 41 in installing and removing the coil winding mechanism on its support. A latch arm 46 engages the end of arm 43 of member 42 to retain it in operating position with the chain 54 meshing with the sprockets 31 and 41. This latch arm 46 is urged to latching position by a coiled spring 47 which extends around the pivot pin 48 and has its fixed end secured at 49.

The coil winding mechanism itself comprises a chain carrying member 50 which is elongated and carries at each end rollers 52 and 53, around which the chain 54 passes, the chain comprising a closed loop having runs along the sides of member 50 between the arcuate ends around the rollers 52 and 53. It is removably fitted into recesses in the upper faces of the arms 43 and 44 as shown in Figure 2, being held in position by gravity. The entire mechanism is lifted out of the receses to position a stator 77 to be wound upon the mechanism or to remove such a stator after the winding is completed.

With the support 42 and chain carrying member 50 rotated about stub shaft 45 to the position as shown in Figures 1 and 2, it will be noted that the chain 54 meshes with both of the sprocket wheels 31 and 41, so that it may be driven thereby. As best shown in Figure 6, the chain carrying member 50 has upper recesses 56 at each end, into which are fitted guide and hook members 58 and 59. As shown in Figure 1, the right hand member 58 carries hooks 60 and 61, while the left hand member 59 carries hooks 64 and 65. The member 50 carries a locating pin 67 in each recess 56, and also carries a round headed stud 69. The pin 67 fits in a corresponding bore in the member 58 or 59, while the stud 69 fits in a snap fastener 71 carried in a recess in member 58 and 59. The members 58 and 59 are thus radially detachable.

The member 50 has a central raised stator support portion as shown in Figures 6 at 73, which carries a locating stud 75. This stud is designed to fit into a winding slot in the inner face of the stator member 77. It will be understood that the locating stud passes into a slot intermediate of the slots in which the coil is being wound and that portion 73 is sufficiently narrow so that it does not obstruct the slots. The arms 43 and 44 of the U-shaped support member 42 carry at their outer ends brackets 80 and 81, to which are pivoted at 82 and 83 the hold-down carrying arms 85 and 86. These arms 85 and 86 are provided with spaced perforations through which pass the rods 88 and 89, the rods having at one end a hold-down member 91 and at the other end a hold-down weight 93. The hold-down member 91 is shown as having a facing 95 which may be formed of felt or similar material which will not damage the enamel or other coating of the wire being wound.

The wire is fed as shown in Figure 3 from an external source of supply, such as the usual wire reel (not shown), from the left of the assembly. The wire 98 passes through a guide opening 99 in the left end 43 of the support member 42. From this opening 99 it passes through the guide member 101 and out around a roller 103 carried by the guide arm 105. From this roller the wire passes through an opening 106 in guide arm 105 and up at 107 through a vertically extending opening in one of the links of the chain 54.

It will be understood that in starting the winding the free end of the wire 98 will be secured to some fixed portion of the assembly, or to the outer face of the stator 77, as by means of an adhesive tape.

It is to be noted also that the guide and hook members 58 as shown in these figures, are oppositely inclined, so that the hooks are not in the same plane. This is for the reason that this particular construction is designed to wind coils into stator slots which do not extend parallel to the axis of the stator, but are inclined thereto. If the slots are parallel to the axis, then both the guide and hook members 58 would be located with their hooks in a horizontal plane and their upper guide surfaces formed symmetrically relative to the horizontal plane.

Referring next to the form of construction shown in Figures 10 to 13 inclusive, this construction differs from that of Figures 1 to 9 inclusive in details of design and in the fact that the chain carrying member is supported from the stator, rather than the stator supported from the chain carrying member, as in the first form of construction.

In Figure 10 the construction is shown in plan view, with the sprocket wheel 112, carried on shaft 114, driving the chain 113, which in this form of construction is shown as passing around idler sprockets 115 carried by the chain carrying member 118, as clearly shown in Figure 12. The chain 113 comprises a closed loop as in the construction shown in Figures 1 to 9 inclusive and has side runs between the sprockets 115 as shown in Figures 10 and 11. The details of the drive of the sprocket wheel 112 have not been shown, but it may be driven in the same general manner as shown in connection with the construction of Figures 1 to 9 inclusive. The stator member which is to be wound has been shown at 117 as a narrow ring and as supported in a yoke 119 secured to the table 120.

As best shown in Figure 14, the stator is held in the yoke by means of clamping members 122 and screws 123.

The chain carrying member 118 has an elongated and rounded guide surface 125 on its upper left portion. A similar guide surface is formed on a separate member 127 which is secured to the member 118 by means of the bolt 129. The head of this bolt 129 is accessible in a slot 130 formed in the surface 125. The member 127 is provided with a guide pin 132 spaced from the bolt 129, which pin aids in holding the parts in adjusted position.

An arcuate extension 134 on member 127 passes within the inner surface of the stator 117 and carries a locating or indexing pin 136 made of a proper size to fit within one of the winding slots of the stator. Arcuate recesses 138 and 140 are formed, respectively, in the upper portion of the guide surface 125 and the similar portion of the guide surface on member 127. These arcuate recesses are identical and serve to receive and form the parts of the wire loops which form the portions of the coils on either face of the stator 117.

The operation of the form of construction shown in Figures 1 to 9 inclusive has been indicated somewhat diagrammatically in Figure 9. In this figure the free end of the wire being wound has been indicated at 150, being shown as attached temporarily to the stator 77. The wire 150 extends from the point of attachment to one of the links of the chain at 152 and passes down through an opening in the link to the opening 106, and thence as indicated at 154 out to the source of supply. This figure may be compared with Figure 3, which shows the feed of the wire to the assembly.

As the chain rotates in a clockwise direction about its supporting or carrying member, it will be seen that when the link 152 reaches the point indicated at 156, the wire indicated at 137 will extend across under the hook 65 from its point of attachment at 150. The wire will be passing over the curved guide surface of member 59. The movement of the chain continues, and when the link containing the wire feed passage has reached the point 158 adjacent the right end of Figure 9, the wire which is now indicated by the dash-and-dot line 160 will have passed under the hook 64 out through the stator 77 into the proper slot and will be caught under hook 60 and extend across the guide surface 58.

As the chain continues to rotate and the feed point returns from point 158 to the initial point 152, the wire now indicated by a full line 162 will pass across from hook 60, underneath hook 61 and back under hook 65. Between hooks 61 and 65 the wire will extend through the second proper slot in the stator 77.

It will be understood that this operation will continue until the winding contains the desired number of turns. After this, the wire will be severed and its free end suitably temporarily attached. While it has not been shown, it will be understood that any standard type of turn counting apparatus may be driven with the chain so as to count and indicate the number of turns.

The two members 58 containing the hooks are next removed, lifting up their rear ends off the snap catch and their front ends off the stud 67, after which they can be tilted so as to unhook the hooks 60, 61, 64 and 65 from the loops of wire. These loops are then manually, or by suitable mechanical means not shown, forced upwardly adjacent the end of the stator in an arc clear of the intermediate stator slots 165. The stator next may be lifted from its support on the winding apparatus sufficiently to clear the indexing stud 75 and then may be rotated to bring that stud into the next adjacent slot 165.

The process is then repeated after reassembling the members 58, and another coil is wound in the next pair of slots. The process is continued step by step until the stator slots all contain the desired coils.

The operation of the form of construction shown in Figures 10 to 13 is quite similar to that described in connection with the other form of apparatus. In this second form, however, the wire winding assembly is carried on the stator rather than being supported independently as the first form of construction. The stator 117 will be mounted in the yoke 119 by means of the clamping members 122 and screws 123. The bolt 129 is loosened so that the member 127 may be slid a short distance to the right. The whole winding assembly, mounted on member 118, is then slipped endwise through the center of the stator and lifted to the position shown in Figures 12 and 13. It will be understood that as it is lifted the locating pin 136 will be slipped into a stator slot and the arcuate extension 134 will be against the inner face of the stator. The bolt 129 is then tightened, which serves to clamp the assembly on the stator.

As shown in Figure 11 the wire 141 passes from any suitable source of supply through the guide eye 142 mounted on bracket 143. From the eye 142 the wire passes up through an opening in a chain link as shown at 144. The free end will be taped to the stator 117 at a suitable point. The chain 113 is then driven in the clockwise direction as by the sprocket 112 and the wire is wound in a manner generally similar to that described in connection with Figure 9.

It will be noted that the members 125 and 127 have their lower lateral portions 145 and 146, respectively, which are adjacent the stator curved to guide the wire into the slots in the stator. As shown in Figure 13 the stator slots 147 are so spaced that one such slot is on each side of the guide members 125 and 127. It will be understood that various guide members may be provided so that they match different sizes of stators and different slot spacings. Instead of the hooks used in the first form of construction to hold the intermediate loops of wire, these loops are drawn down into the recesses 138 and 140, which gives these loops an arcuate form clear of the intervening stator slots as clearly shown in Figure 14 at 148.

After the desired number of turns has been wound, the stator 117 may be loosened in its yoke by loosening screws 123 and rotated an amount equal to the spacing between adjacent stator slots. The coil winding assembly is then unclamped from the stator by loosening bolt 129, dropped down to clear the locating stud 136 and brought up again to fit that stud in the next adjacent slot. The bolt 129 is then tightened and the parts are in position so that the chain 113 is again meshing with the sprocket 112. Another stator winding is wound as just described. The process is then continued until all of the desired windings have been made.

It will be apparent that both forms of construction may be modified in size and in contour and location of guide elements so that they will guide wires into slots in stators of widely different types with slots of different spacing and character. The constructions shown are to be understood as illustrative only, and I contemplate such modifications which come within the scope and spirit of the appended claims.

I claim:

1. An internally slotted stator frame, and coil winding apparatus comprising a chain carrying member located in the internally slotted stator frame, a continuous chain carried by the chain carrying member and extending around the member, means for driving the chain around the chain carrying member with opposite runs of the chain moving within the stator frame in opposite directions, means for feeding a wire to the chain, and means for guiding a wire from the chain to a stator slot.

2. An internally slotted stator frame, and coil winding apparatus comprising a chain carrying member located in the internally slotted stator frame, a continuous chain carried by the chain carrying member and extending around the member, means for driving the chain around the chain carrying member with opposite runs of the chain moving within the stator frame in opposite directions, the chain having a wire winding passage formed therein, means for feeding a wire to the wire winding passage, and means for guiding a wire from the wire winding passage to a stator slot.

3. An internally slotted stator frame, and coil winding apparatus for winding coils in a pair of stator slots, the apparatus comprising an elongated chain carrying member, a continuous chain extending around the chain carrying member, both chain and member being located within the stator, means for driving the chain around the chain carrying member with runs of the chain along the opposite elongated sides of the member passing through the stator in opposite directions, means for feeding a wire to the chain, and means for guiding a wire from the chain continuously and consecutively to a pair of stator slots.

4. An internally slotted stator frame, and coil winding apparatus for winding coils in a pair of stator slots, the apparatus comprising an elongated chain carrying member, a continuous chain extending around the chain carrying member, both chain and member being located within the stator, means for driving the chain around the chain carrying member with runs of the chain along the opposite elongated sides of the member passing through the stator in opposite directions, means for feeding a wire to the chain, means for guiding a wire from the chain continuously and consecutively to a pair of stator slots, and means for forming intermediate portions of the wire adjacent end faces of the stator.

5. An internally slotted stator frame, and coil winding apparatus for winding coils in a pair of stator slots, the apparatus comprising an elongated chain carrying member, a continuous chain extending around the chain carrying member, both chain and member being located within the stator, means for driving the chain around the chain carrying member with runs of the chain along the opposite elongated sides of the member passing through the stator in opposite directions, means for feeding a wire to the chain, means for guiding a wire from the chain continuously and consecutively to a pair of stator slots, and hooks adjacent the stator faces for holding loops of the wire adjacent the end faces of the stator.

6. An internally slotted stator frame, and coil winding apparatus for winding coils in a pair of stator slots, said apparatus comprising a chain carrying member adapted to extend through the interior opening of a stator, a continuous chain carried by the member, said chain having runs on opposite sides of the chain carrying member adapted to extend through the interior opening of a stator, means for feeding a wire to the chain, means for guiding a wire from the chain to the stator slots, and means for positively driving the chain to move it around the chain carrying member.

7. An internally slotted stator frame, and coil winding apparatus comprising an elongated chain carrying member located within and extending through the internally slotted stator frame, a continuous chain supported from the chain carrying member and having runs extending along the lateral edges of the member, and extending through the stator frame, locating means carried by the member to locate a stator relative to the member, the chain having a wire winding passage formed therein, means for feeding a wire to said passage and means for guiding a wire from the passage to slots in the stator.

8. An internally slotted stator frame, and coil winding apparatus comprising an elongated chain carrying member located in the internally slotted stator frame, a continuous chain supported from the chain carrying member and having runs extending along the lateral edges of the member, locating means carried by the member to locate a stator relative to the member, the chain having a wire winding passage formed therein, means for feeding a wire to said passage and means for guiding a wire from the passage to slots in the stator, said last named means comprising rounded guide surfaces at each end of the chain carrying member.

9. An internally slotted stator frame, and coil winding apparatus comprising an elongated chain carrying member located in the internally slotted stator frame, a continuous chain supported from the chain carrying member and having runs extending along the lateral edges of the member, locating means carried by the member to locate a stator relative to the member, the chain having a wire winding passage formed therein, means for feeding a wire to said passage and means for guiding a wire from the passage to slots in the stator, said last named means comprising rounded guide surfaces at each end of the chain carrying member and means at the inner ends of such surfaces to form the transverse portions of wire loops.

10. An internally slotted stator frame, and coil winding apparatus comprising an elongated chain carrying member located in the internally slotted stator frame, a continuous chain supported from the chain carrying member and having runs extending along the lateral edges of the member, locating means carried by the member to locate a stator relative to the member, the chain having a wire winding passage formed therein, means for feeding a wire to said passage and means for guiding a wire from the passage to slots in the stator, said last named means comprising rounded guide surfaces at each end of the chain carrying member and spaced hooks at the inner ends of such surfaces to receive and hold the transverse portions of wire loops.

11. An internally slotted stator frame, and coil winding apparatus comprising an elongated chain carrying member located in the internally slotted stator frame, a continuous chain supported from the chain carrying member and having runs extending along the lateral edges of the member, locating means carried by the member to locate a stator relative to the member, the chain having a wire winding passage formed therein, means for feeding a wire to said passage and means for guiding a wire from the passage to slots in the stator, said last named means comprising rounded guide surfaces at each end of the chain carrying member and transversely extending arcuate recesses at the inner end of such surfaces to receive and form transverse portions of wire loops adjacent the stator ends.

12. An internally slotted stator frame, and coil winding apparatus comprising an elongated chain carrying member adapted to be inserted through the internally slotted frame, the member being substantially longer than the axial length of the frame and being adapted to extend beyond both ends of the frame, centrally located stator support and locating means carried by the member, a continuous chain carried by the member about its periphery, means for continuously moving the chain around the chain carrying member, the chain having a wire winding passage extending therethrough, said passage being movable with the chain, means for feeding a wire to the passage and means for guiding a wire from the passage to slots in a stator.

13. An internally slotted stator frame, and coil winding apparatus comprising an elongated chain carrying member adapted to be inserted through the internally slotted frame, the member being substantially longer than the axial length of the frame and being adapted to extend beyond both ends of the frame, centrally located stator support and locating means carried by the member, a continuous chain carried by the member about its periphery, means for continuously moving the chain around the chain carrying member, said means comprising a driven sprocket engaging the outer face of the chain, the chain having a wire winding passage extending therethrough, said passage being movable with the chain, means for feeding a wire to the passage and means for guiding a wire from the passage to slots in a stator.

14. An internally slotted stator frame, and coil winding apparatus comprising an elongated chain carrying member adapted to be inserted through the internally slotted frame, the member being substantially longer than the axial length of the frame and being adapted to extend beyond both ends of the frame, centrally located stator support and locating means carried by the member, a continuous chain carried by the member about its periphery, means for continuously moving the chain around the chain carrying member, said means comprising a driven sprocket engaging the outer face of the chain, a movable support for the chain carrying member whereby the chain may be moved into and out of engagement with the sprocket, the chain having a wire winding passage extending therethrough, said passage being movable with the chain, means for feeding a wire to the passage and means for guiding a wire from the passage to slots in a stator.

15. An internally slotted stator frame, and coil winding apparatus comprising an elongated chain carrying member located within the central opening of the internally slotted stator frame and extending substantially beyond the ends of the frame, means carried by the member to engage the stator and locate the stator and member relative to each other, a continuous chain carried by the member, the chain being continuously movable about the periphery of said member, the chain having a wire winding passage extending therethrough, means for feeding a wire to said wire winding passage and means for guiding a wire from the passage to slots in the stator as the chain moves around the chain carrying member.

16. An internally slotted stator frame, and coil winding apparatus comprising an elongated chain carrying member located within the central opening of the internally slotted stator frame and extending substantially beyond the ends of the frame, means carried by the member to engage the stator and locate the stator and member relative to each other, a continuous chain carried by the member, the chain being continuously movable about the periphery of said member, the chain having a wire winding passage extending therethrough, means for feeding a wire to said wire winding passage, said means including a guide member located adjacent the center of the chain carrying member, and means for guiding a wire from the passage to slots in the stator as the chain moves around the chain carrying member.

17. An internally slotted stator frame, and coil winding apparatus comprising an elongated chain carrying member located within the central opening of the internally slotted stator frame and extending substantially beyond the ends of the frame, means carried by the member to engage the stator and locate the stator and member relative to each other, a continuous chain carried by the member, the chain being continuously movable about the periphery of said member, the chain having a wire winding passage extending therethrough, means for feeding a wire to said wire winding passage and means for guiding a wire from the passage to slots in the stator as the chain moves around the chain carrying member, said guide means comprising rounded surfaces carried by the end portions of the chain carrying member, and means for holding a wire in contact with said surfaces.

18. An apparatus for winding coils in a stator frame having internal slots therein, said apparatus comprising a chain carrying member adapted to be inserted in the stator frame, a continuous chain carried by the chain carrying member and extending around the member, supporting means for the chain carrying member and chain engaging outer portions of the chain, means for driving the chain around the chain carrying member with opposite runs of the chain moving within a stator frame in opposite directions, means for feeding a wire to the chain and means for guiding a wire from the chain to a stator slot.

19. An apparatus for winding coils in a stator frame having internal slots therein, said apparatus comprising a chain carrying member adapted to be inserted in the stator frame, a continuous chain carried by the chain carrying member and extending around the member, supporting means for the chain carrying member and chain engaging outer portions of the chain, means for driving the chain around the chain carrying member with opposite runs of the chain moving within a stator frame in opposite directions, means located below the chain carrying member and chain for feeding wire to the chain internally of the supporting means for the chain carrying member and chain, and means for guiding a wire from the chain to a stator slot.

20. An apparatus for winding coils in a stator frame having internal slots therein, said apparatus comprising a chain carrying member adapted to be inserted in the stator frame, a continuous chain carried by the chain carrying member and extending around the member, supporting means for the chain carrying member and chain engaging outer portions of the chain, means for driving the chain around the chain carrying member with opposite runs of the chain moving within a stator frame in opposite directions, said driving means comprising a pair of driven sprockets engaging the outer face of the chain, one sprocket engaging each run of the chain, means for feeding wire to the chain and means for guiding a wire from the chain to a stator slot.

21. An apparatus for winding coils in a stator frame having internal slots therein, said apparatus comprising a chain carrying member adapted to be inserted in the stator frame, a continuous chain carried by the chain carrying member and extending around the member, supporting means for the chain carrying member and chain engaging outer portions of the chain, means for driving the chain around the chain carrying member with opposite runs of the chain moving within a stator frame in opposite directions, said driving means comprising a pair of driven sprockets engaging the outer face of the chain, one sprocket engaging each run of the chain, the supporting means for the chain carrying member and chain being provided with a pivot intermediate the sprockets whereby the chain may be swung into and out of engagement with the sprockets, means for feeding wire to the chain and means for guiding a wire from the chain to a stator slot.

References Cited in the file of this patent

UNITED STATES PATENTS

| | | |
|---|---|---|
| 1,179,035 | Prouty | Apr. 11, 1916 |
| 1,253,884 | Prouty | Jan. 15, 1918 |
| 2,328,725 | Knobel | Sept. 7, 1943 |
| 2,445,937 | Carpenter | July 27, 1948 |

FOREIGN PATENTS

| | | |
|---|---|---|
| 580,580 | Great Britain | Sept. 12, 1946 |